(12) United States Patent
Kashima et al.

(10) Patent No.: US 10,802,279 B2
(45) Date of Patent: Oct. 13, 2020

(54) DISPLAY SYSTEM, DISPLAY METHOD, AND COMPUTER APPARATUS FOR DISPLAYING ADDITIONAL INFORMATION OF A GAME CHARACTER BASED ON LINE OF SIGHT

(71) Applicants: SQUARE ENIX CO., LTD., Tokyo (JP); GREE, Inc., Tokyo (JP)

(72) Inventors: Naoya Kashima, Tokyo (JP); Yoshihisa Akashi, Tokyo (JP); Robin Boucher, Tokyo (JP); Natsuko Kushida, Tokyo (JP)

(73) Assignees: SQUARE ENIX CO., LTD., Tokyo (JP); GREE, INC., Tokyo (JP)

( * ) Notice: Subject to any disclaimer, the term of this patent is extended or adjusted under 35 U.S.C. 154(b) by 0 days.

(21) Appl. No.: 15/698,085

(22) Filed: Sep. 7, 2017

(65) Prior Publication Data

US 2018/0074328 A1 Mar. 15, 2018

(30) Foreign Application Priority Data

Sep. 14, 2016 (JP) ................................. 2016-179939

(51) Int. Cl.
*G02B 27/01* (2006.01)
*A63F 13/426* (2014.01)
(Continued)

(52) U.S. Cl.
CPC ........ *G02B 27/0172* (2013.01); *A63F 13/426* (2014.09); *A63F 13/5372* (2014.09);
(Continued)

(58) Field of Classification Search
CPC ... G02B 27/01–0189; G02B 2027/0105–0198; A63F 13/525–5258;
(Continued)

(56) References Cited

U.S. PATENT DOCUMENTS 6,426,740 B1 * 7/2002 Goto ......................... A61F 4/00
345/157
9,857,884 B2 * 1/2018 Arai ....................... G06F 3/0321
(Continued)

FOREIGN PATENT DOCUMENTS

JP 2005-038008 A 2/2005
JP 2016-93363 5/2016
(Continued)

OTHER PUBLICATIONS

Japanese Office Action dated Jun. 23, 2020 issued in Japanese Patent Application 2016-179939.

*Primary Examiner* — Gene W Lee
(74) *Attorney, Agent, or Firm* — Greenblum & Bernstein, P.L.C.

(57) ABSTRACT

A display system including a display device which is used by being mounted on the head of a player, comprising: a virtual camera specifier that specifies a visual axis and/or a position of a virtual camera in a virtual space, according to a direction and/or a position of the display device; and a displayer that displays an object present in the virtual space, on the display device, according to the visual axis and/or the position of the virtual camera, wherein in a case where there is an object on the visual axis specified by the virtual camera specifier, the displayer additionally displays information associated with the object.

15 Claims, 9 Drawing Sheets

(51) Int. Cl.
*H04N 13/279* (2018.01)
*H04N 13/383* (2018.01)
*H04N 13/344* (2018.01)
*G06F 3/0487* (2013.01)
*H04N 13/117* (2018.01)
*A63F 13/5372* (2014.01)
*A63F 13/211* (2014.01)

(52) U.S. Cl.
CPC ......... *G06F 3/0487* (2013.01); *H04N 13/117* (2018.05); *H04N 13/279* (2018.05); *H04N 13/344* (2018.05); *H04N 13/383* (2018.05); *A63F 13/211* (2014.09); *A63F 2300/6653* (2013.01); *G02B 2027/014* (2013.01); *G02B 2027/0187* (2013.01)

(58) Field of Classification Search
CPC ...... A63F 2300/6661; A63F 2300/6669; A63F 2300/6676; A63F 2300/6684; G06F 3/011–013
See application file for complete search history.

(56) References Cited

U.S. PATENT DOCUMENTS

| | | | |
|---|---|---|---|
| 9,971,157 B2* | 5/2018 | Yoshioka | G06F 3/14 |
| 2009/0128552 A1* | 5/2009 | Fujiki | G06T 19/006 |
| | | | 345/419 |
| 2009/0305758 A1* | 12/2009 | Nomura | A63F 13/822 |
| | | | 463/7 |
| 2011/0250966 A1* | 10/2011 | Ohara | A63F 13/5375 |
| | | | 463/36 |
| 2014/0168056 A1* | 6/2014 | Swaminathan | G06F 3/147 |
| | | | 345/156 |
| 2015/0202532 A1* | 7/2015 | Takeuchi | A63F 13/79 |
| | | | 463/42 |
| 2017/0024935 A1 | 1/2017 | Baba | |
| 2017/0059871 A1 | 3/2017 | Hashiba et al. | |
| 2017/0076496 A1* | 3/2017 | Inomata | G06F 3/012 |
| 2017/0123491 A1* | 5/2017 | Hansen | G06F 3/012 |
| 2017/0269685 A1* | 9/2017 | Marks | A63F 13/533 |
| 2017/0277260 A1* | 9/2017 | Tamaoki | G02B 27/0093 |
| 2017/0285737 A1* | 10/2017 | Khalid | G06F 3/013 |
| 2017/0294048 A1* | 10/2017 | Noguchi | G06F 3/04812 |
| 2017/0336879 A1* | 11/2017 | Arai | G06F 1/163 |
| 2018/0005431 A1* | 1/2018 | Yoshioka | G06F 3/011 |
| 2018/0011681 A1* | 1/2018 | Kada | G06F 3/165 |
| 2018/0015362 A1* | 1/2018 | Terahata | A63F 13/26 |
| 2018/0031845 A1* | 2/2018 | Yoshioka | G03B 25/02 |
| 2018/0053337 A1* | 2/2018 | Nakashima | H04N 13/344 |
| 2018/0054568 A1* | 2/2018 | Sugawara | G02B 27/0172 |
| 2018/0061003 A1* | 3/2018 | Kono | G06T 3/20 |
| 2018/0107287 A1* | 4/2018 | Arai | G06F 3/011 |
| 2019/0011981 A1* | 1/2019 | Noguchi | G06F 3/0308 |

FOREIGN PATENT DOCUMENTS

| | | |
|---|---|---|
| JP | 5944600 B | 7/2016 |
| JP | 5981591 B | 8/2016 |

* cited by examiner

DISPLAY SYSTEM, DISPLAY METHOD, AND COMPUTER APPARATUS FOR DISPLAYING ADDITIONAL INFORMATION OF A GAME CHARACTER BASED ON LINE OF SIGHT

CROSS REFERENCE TO RELATED APPLICATION

The present disclosure relates to subject matter contained in Japanese Patent Application No. 2016-179939, filed on Sep. 14, 2016, the disclosure of which is expressly incorporated herein by reference in its entirety.

BACKGROUND OF THE INVENTION

Field of the Invention

The present invention relates to a display system using a display device mounted on a head of a player, a display method, and a computer device.

Description of Related Art

In recent years, attention has been drawn to a virtual reality (VR) technique using a head mount display and the like in the game industry. For example, an image of the virtual world in a game is displayed on the head mount display, thereby the user can feel the virtual world as if it is a real world, and the sense of immersion can be enhanced in the game. Therefore, the VR technique is expected as a technique for improving taste of a game.

For example, JP-A-2016-93363 discloses a technique of generating a game field image, by using a viewpoint position determined based on a predetermined rule and a line-of-sight direction determined based on a posture of a head mount display, and generating an image of a virtual space to be displayed on a head mount display, by adding information on a game to the generated game field image.

SUMMARY OF THE INVENTION

Technical Problem

However, when the information on the game is displayed on the image of the virtual space displayed on the head mount display, as in JP-A-2016-93363, there is strong recognition that the image displayed on the head mount display belongs to the virtual space, and thus there is a concern that the sense of immersion in games may be diminished. On the other hand, for example, in a case where information related to the game such as the name and physical strength of the game character is not displayed, there is a concern that the user feels inconvenient.

An object of at least one embodiment of the present invention is to provide a display system, a display device, and a display method, capable of presenting information on a game or the like to a user, while suppressing a decrease in the sense of immersion in a game.

Solution to Problem

According to a non-limiting aspect, a display system including a display device which is used by being mounted on the head of a player, comprising: a virtual camera specifier that specifies a visual axis and/or a position of a virtual camera in a virtual space, according to a direction and/or a position of the display device; and a displayer that displays an object present in the virtual space, on the display device, according to the visual axis and/or the position of the virtual camera, wherein in a case where there is an object on the visual axis specified by the virtual camera specifier, the displayer additionally displays information associated with the object.

According to a non-limiting aspect, a display method executed in a display system comprising a display device which is used by being mounted on the head of a player, and a computer device, comprising: a virtual camera specifying step of specifying a visual axis and/or a position of a virtual camera in a virtual space, according to a direction and/or a position of the display device; and a display step of displaying an object present in the virtual space, on the display device, according to the visual axis and/or the position of the virtual camera, wherein in the display step, in a case where there is an object on the visual axis specified in the virtual camera specifying step, information associated with the object is additionally displayed.

According to a non-limiting aspect, a computer device capable of being connected to a display device which is used by being mounted on the head of a player, by communication, comprising: a virtual camera specifier that specifies a visual axis and/or a position of a virtual camera in a virtual space, according to a direction and/or a position of the display device; and a displayer that displays an object present in the virtual space, on the display device, according to the visual axis and/or the position of the virtual camera, wherein in a case where there is an object on the visual axis specified by the virtual camera specifier, the displayer additionally displays information associated with the object.

Advantageous Effects of Invention

One or more of the above problems can be solved with each embodiment of the present invention.

DESCRIPTION OF EMBODIMENTS

Hereinafter, embodiments of the invention will be described with reference to the accompanying drawings. Hereinafter, description relating to effects shows an aspect of the effects of the embodiments of the invention, and does not limit the effects. Further, the order of respective processes that form a flowchart described below may be changed in a range without contradicting or creating discord with the processing contents thereof.

Figure 1A:
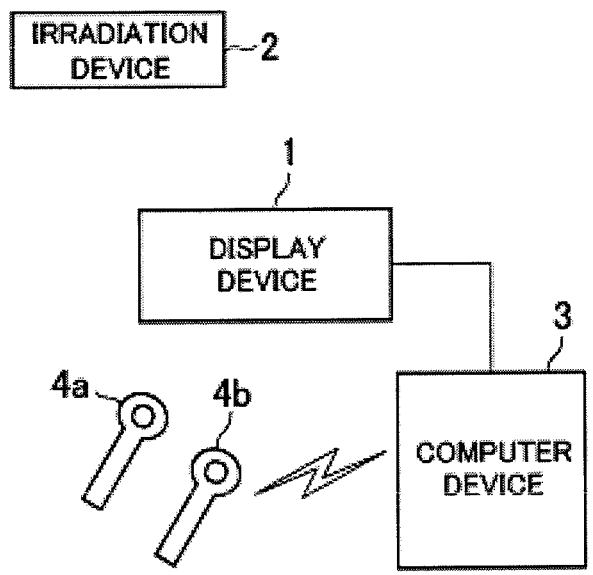
FIGS. 1A and 1B are block diagrams showing a configuration of a system corresponding to at least one of the embodiments of the present invention.
Figure 1B:
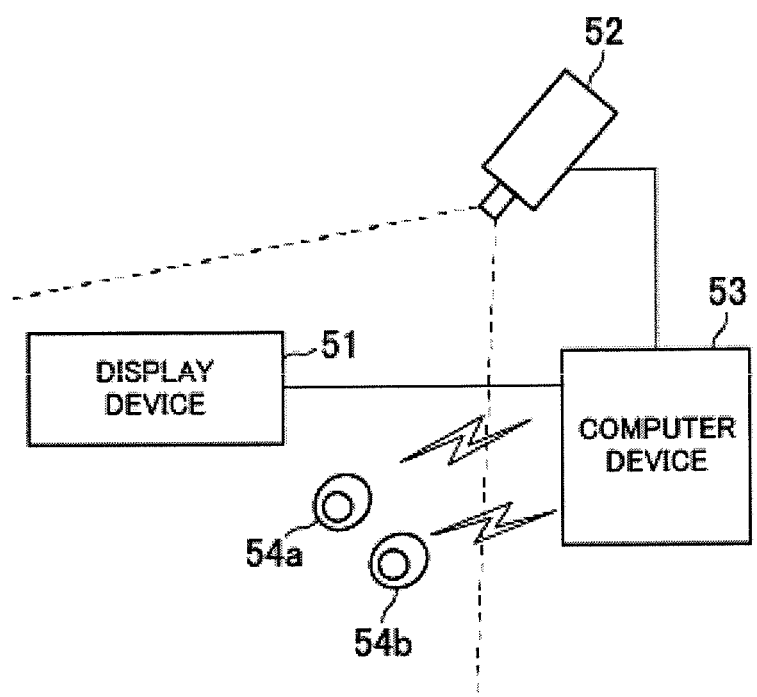

An overview of embodiments of the present invention will be described. FIGS. 1A and 1B are block diagrams showing a configuration of a system corresponding to at least one of the embodiments of the present invention.

FIG. 1A is a diagram showing one example relating to the configuration of the system. The system includes a display device 1 equipped with a sensor, an irradiation device 2 that irradiates a light beam, a computer device 3 that generates or processes an image to be displayed on the display device 1, and a controller 4 equipped with a sensor.

The display device 1 is preferably a goggle-type display device to be mounted on the head so as to cover the field of view. The display may be a transmissive display having a high transmittance or a non-transmissive display having a low transmittance. In addition, the display device 1 can specify the user's posture by using a plurality of mounted sensors. The configuration of the display device 1 will be described later.

The irradiation device 2 is a device that irradiates a laser beam in a wide range. If the periphery of the irradiation device 2 is irradiated with a laser beam, the laser beam is sensed by optical sensors, which are mounted on the display device 1 and the controller 4, and the positions of the display device 1 and the controller 4 are specified. This position specifying method is called "Lighthouse method". In order to specify the position more accurately, it is preferable that at least two irradiation devices 2 are provided with a predetermined interval.

The computer device 3 can be connected to the display device 1 and the controller 4 by communication. Communication may be performed in a wired or wireless manner. The computer device 3 may be a device independent from the display device 1, or may be an integrated device incorporated in the display device 1.

The controller 4 is an input device that includes a button and a trigger, and receives an input by a user's operation. In addition, the controller 4 is equipped with an optical sensor which is able to sense the laser beam irradiated from the irradiation device 2. Furthermore, the controller 4 is equipped with a touch sensor which is able to receive an input by a user's touch. The controller 4 is used in pairs by being held with the left and right hands, but only one of them may be used.

FIG. 1B is a diagram showing one example relating to the configuration of a system different from the system shown in FIG. 1A. The system shown in FIG. 1B includes a display device 51 having a light emitting unit as a light source, an imaging device 52 that captures an image of light emitted from the light emitting units which are light sources of the display device 51 and a controller 54, a computer device 53 that generates or processes an image to be displayed on the display device 51, and the controller 54 having a light emitting unit as a light source.

The display device 51 is preferably a goggle-type display device to be mounted on the head so as to cover the field of view, similar to the display device 1. The display may be a transmissive display having a high transmittance or a non-transmissive display having a low transmittance.

The imaging device 52 is a device that specifies the positions of the display device 51 and the controller 54 by capturing an image of light emitted from the light emitting units which are light sources of the display device 51 and the controller 54.

The computer device 53 can be connected to the display device 51 and the controller 54 by communication. Communication may be performed in a wired or wireless manner.

The controller 54 is an input device that has a button and receives an input by a user's operation. The controller 54 also has a light emitting unit which is a light source, and the imaging device 52 captures an image of light emitted from the controller 54 to specify the position of the controller 54. The controller is to be held with the hand, and it is preferable to use the controller as a pair, but one controller may be used.

In the following description, in the embodiment of the present invention, it is assumed that the positions of the display device 1 and the controller 4 are specified by the system shown in FIG. 1A. However, the present invention is not limited to the system. For example, it may be the system shown in FIG. 1B or a system in which the display device is mounted on a body part other than the head, and the positions of the display device 1 and the controller 4 are specified.

The image displayed on the display device 1 is an image generated or processed by the computer device 3, based on a value measured by the sensor mounted on the display device 1 and a user's input operation to the controller 4.

Figure 2:
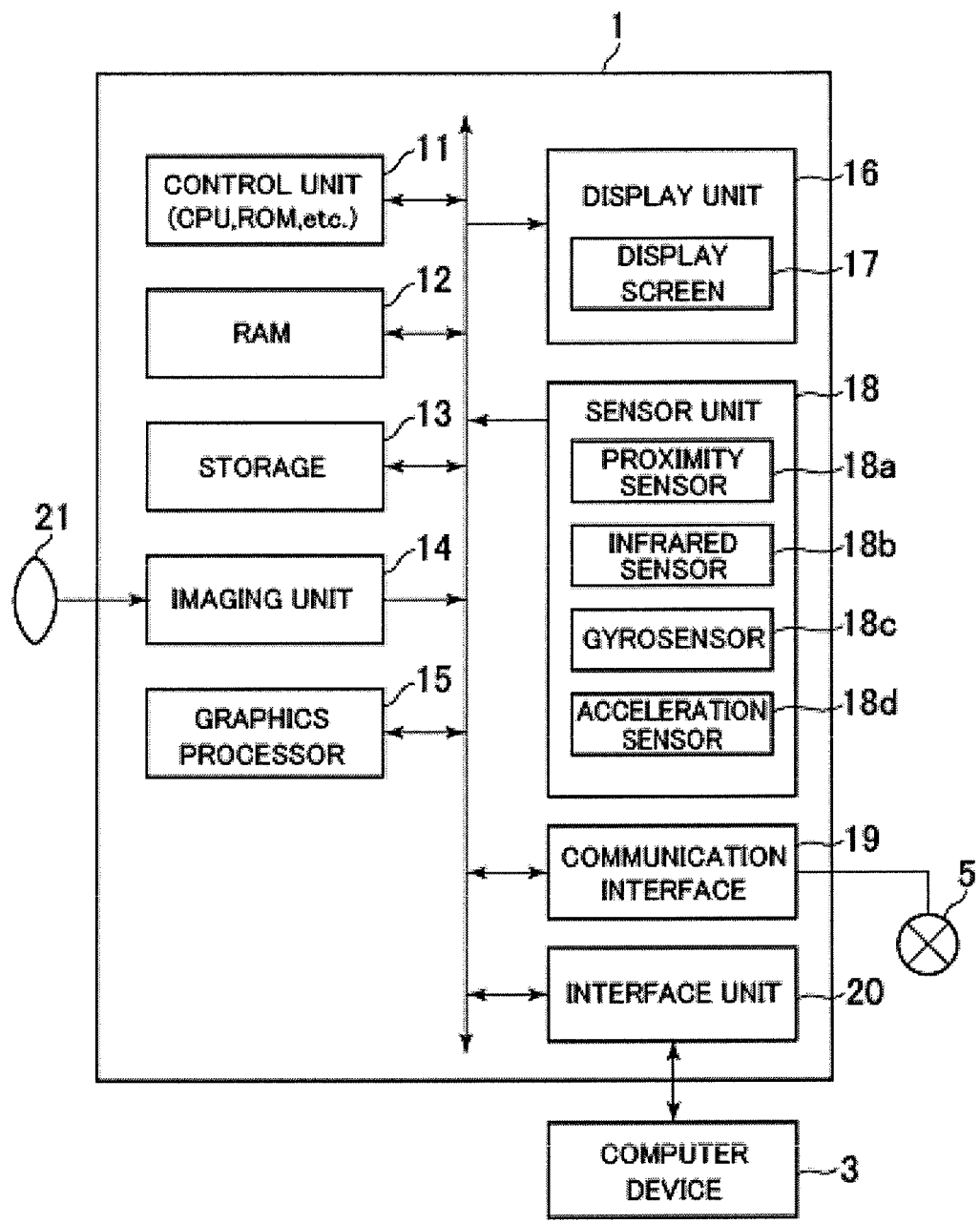
FIG. 2 is a block diagram showing a configuration of a display device corresponding to at least one of the embodiments of the present invention.

Here, the configuration of the display device 1 will be described. FIG. 2 is a block diagram showing a configuration of a display device corresponding to at least one of the embodiments of the present invention. The display device 1 includes a control unit 11, a Random Access Memory (RAM) 12, a storage 13, an imaging unit 14, a graphics processor 15, a display unit 16, a sensor unit 18, a communication interface 19, an interface unit 20, and a lens 21, and these components are connected to each other by an internal bus.

The control unit 11 is configured to include a Central Processing Unit (CPU) and a Read Only Memory (ROM). The control unit 11 executes a program stored in the storage 13 so as to control the display device 1. The RAM 12 is a work area of the control unit 11. The storage 13 is a storage area for storing programs and data.

The control unit 11 performs processing by reading programs and data from the RAM 12 and the storage 13. The control unit 11 processes the program and data which are loaded in the RAM 12, thereby output a drawing command to the graphics processor 15. Further, the control unit 11 performs processes based on various values measured by the sensor unit 18, or transmits data to the computer device 3 through the interface unit 20.

The imaging unit 14 outputs an image captured through the lens 21 to the graphics processor 15. In a case where the display device 1 is mounted on the head and the field of view is covered, information on the outside of the device cannot be checked. Therefore, by displaying information captured by the imaging unit 14 on a display screen 17 of the display unit 16, which will be described later, the user can recognize the real space and thus the safety can be secured.

The graphics processor 15 executes drawing of one image in the unit of frames. One frame time for the image is, for example, 1/30 seconds. The graphics processor 15 has a function of receiving a part of a calculation process relating to the drawing performed only by the controller to disperse a load of the entire system.

The display unit 16 has the display screen 17, and is provided inside the goggle of the display device 1 covering the user's field of view. For example, an organic EL or an inorganic EL is used as the display screen 17, but the present invention is not limited to these.

The sensor unit 18 includes at least a proximity sensor 18a, an infrared sensor 18b, a gyrosensor 18c, and an acceleration sensor 18d. The proximity sensor 18a is provided in the goggle portion of the display device 1, and is used for determining the presence or absence of contact with the user's face. A plurality of infrared sensors 18b are provided in the display device 1, and are used to specify the position of the display device 1 by detecting light beams irradiated from the irradiation device 2. The gyrosensor 18c and the acceleration sensor 18d are used for specifying the user's posture.

Figure 3:
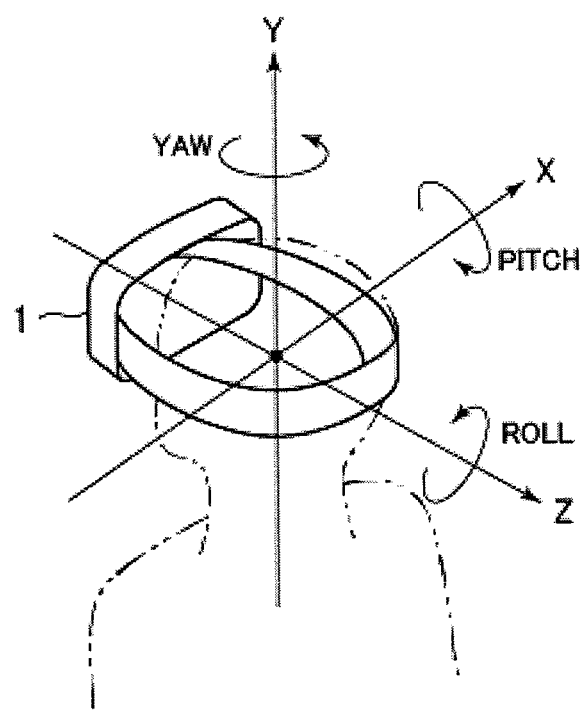
FIG. 3 is a diagram showing a Cartesian coordinate system for specifying the user's posture in a case where the display device is mounted on the head, corresponding to at least one of the embodiments of the present invention.

Here, a method of specifying a user's posture will be described with reference to the drawings. FIG. 3 is a diagram showing a Cartesian coordinate system for specifying the user's posture in a case where the display device is mounted on the head, corresponding to at least one of the embodiments of the present invention.

As shown in FIG. 3, the XYZ-coordinates are defined around the head of the user wearing the display device 1. A vertical direction in which the user stands upright is defined as a Y-axis (yaw angle), a direction which is orthogonal to the Y-axis and connects the center of the display screen 17 of the display device 1 and the head of the user is defined as a Z-axis (roll angle), and a direction orthogonal to the Y axis and the Z-axis is defined as an X-axis (pitch angle). The gyrosensor 18c detects the angle (inclination) around each axis, and the acceleration sensor 18d detects the movement of the display device 1. The image to be displayed on the display screen 17 is changed according to the detected angle and the detected movement. The display device 1 can specify the user's posture, using values measured by a plurality of sensors (hereinafter referred to as posture information).

Subsequently, the communication interface 19 can be connected to a communication network 5 in a wireless or wired manner, and may receive data via the communication network 5. The data received via the communication interface 19 is loaded into the RAM 12, and is subjected to calculation processing by the control unit 11.

The interface unit 20 is mainly connected to the computer device 3, and can receive data such as images processed or generated by the computer device 3. Further, it is also possible to transmit measured values of various sensors acquired by the sensor unit 18 to the computer device 3.

Figure 4:
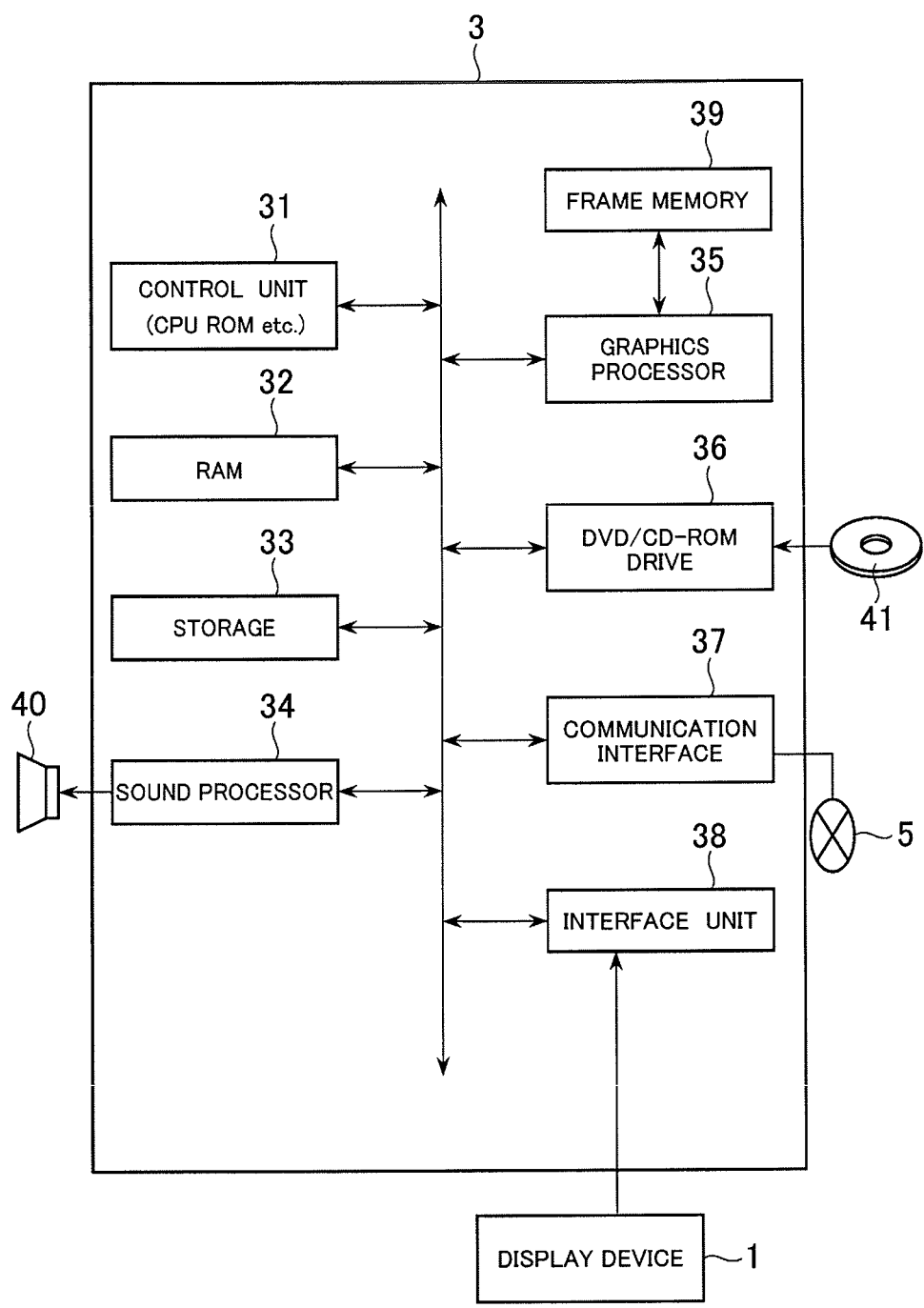
FIG. 4 is a block diagram showing a configuration of a computer device corresponding to at least one of the embodiments of the present invention.

Subsequently, the computer device 3 will be described. FIG. 4 is a block diagram showing a configuration of a computer device corresponding to at least one of the embodiments of the present invention. The computer device 3 includes a control unit 31, a RAM 32, a storage 33, a sound processor 34, a graphics processor 35, a DVD/CD-ROM drive 36, a communication interface 37, an interface unit 38, and a frame memory 39, and these components are connected to each other by an internal bus.

The control unit 31 is configured to include a CPU and a ROM. The control unit 31 executes a program stored in the storage 33 so as to control the computer device 3. The RAM 32 is a work area of the control unit 31. The storage 33 is a storage area for storing programs and data.

The control unit 31 performs processing by reading programs and data from the RAM 32. The control unit 31 processes the program and data loaded in the RAM 32 to output a drawing command to the graphics processor 35.

The sound processor 34 is connected to a sound output device 40. When the control unit 31 outputs a sound output instruction to the sound processor 34, the sound processor 34 outputs a sound signal to the sound output device 40. The sound output device 40 is, for example, a headphone, and the user may mount it on the head together with the display device 1, or the speaker may be incorporated in the display device 1.

The graphics processor 35 executes drawing of one image in the unit of frames. One frame time for the image is, for example, 1/60th second. The graphics processor 35 has a function of receiving a part of a calculation process relating to the drawing performed only by the controller to disperse a load of the entire system. Since the graphics processor 35 of the computer device 3 generates an image to be displayed on the display screen 17, based on the position information and the posture information of the display device 1 and the position information of the controller 4, it requires higher performance than the graphics processor 15 included in the display device 1.

The DVD/CD-ROM drive 36 reads data from a disc 41, loads the data into the RAM 32, and the control unit 31 performs a calculation process. The type of the disc 41 is not limited to the DVD or the CD, but may be a Blu-ray (registered trademark) disc or other standards.

The communication interface 37 can be connected to the communication network 5 in a wireless or wired manner, and may receive data via the communication network 5. The data received via the communication interface 37 is loaded into the RAM 32 in the same manner as the data read from the disc 41, and is subjected to calculation processing by the control unit 31.

The interface unit 38 is mainly connected to the display device 1, and can transmit data such as images processed or generated by the computer device 3.

In the above description, the display device 1 and the computer device 3 are described as separate devices, but all of the processes of the computer device 3 may be performed by the display device 1. In that case, the computer device 3 is not required, and the controller 4 is connected to the display device 1 by communication.

Subsequently, the program execution process according to the embodiment of the present invention will be described. An example of the embodiment of the present invention is a game in which a player performs virtual battle with an enemy character in a virtual world, and if cards to be owned by a player is selected, the action of a player character is determined, and the virtual battle progresses. The player may operate a single player character, or a team composed of a plurality of player characters. The card owned by the player is stored in the player account directly or in association with the player character.

Figure 5:
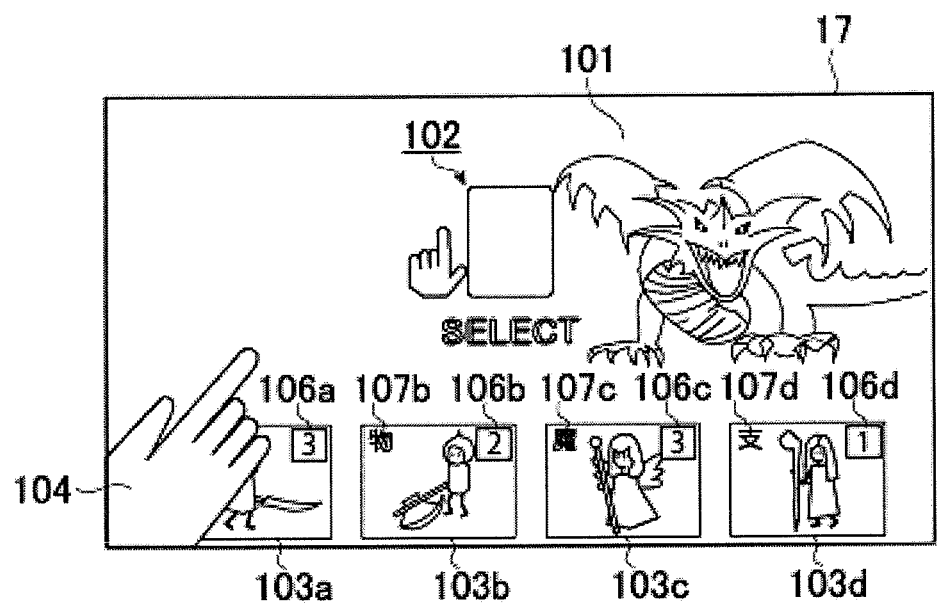
FIG. 5 is an example of a game execution screen, corresponding to at least one of the embodiments of the present invention.

FIG. 5 is an example of a game execution screen, corresponding to at least one of the embodiments of the present invention. On the display screen 17, the status of the virtual battle is displayed, and at least an enemy character 101, system instruction information 102, a card group 103 usable by a player character and imitating a plurality of characters, which is an option to be selected by the player, and a hand portion 104 of the player in the virtual world are displayed. Although not shown, the player character has a value representing the physical strength of the player character (hereinafter referred to as a physical strength value), and when the physical strength value disappears, the player character becomes a battle impossible state and the game ends. In addition, when the life force (not shown) of the enemy character 101 disappears, the enemy character becomes a battle impossible state, it is determined that the player has won, and the game ends.

By operating the controller 4, the player instructs the player character in the virtual world to take action. The operation of the controller 4 is, for example, an operation of changing the position and inclination of the controller 4, or a pressing or touching operation with respect to a button or the like of the controller 4. By using change information on the position and inclination of the controller 4 as input information, the player can perform an intuitive operation and can concentrate more on the game.

As a premise of the embodiment of the present invention, when the program is executed, the control unit 31 of the computer device 3 causes the graphics processor 35 to output the virtual space defined by the program. Further, the position of the player wearing the display device 1 on the head, and the position of the controller 4 are specified based on the position and direction where the light beam irradiated from the irradiation device 2 is received. Furthermore, the posture of the display device 1 is specified, based on the measured values of various sensors of the sensor unit 18 of the display device 1.

Figure 6:
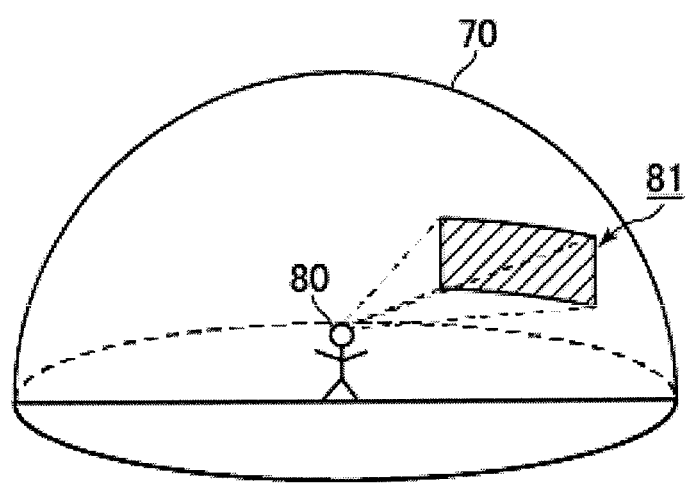
FIG. 6 is a diagram showing a concept of a virtual space, corresponding to at least one of the embodiments of the present invention.

FIG. 6 is a diagram showing a concept of a virtual space, corresponding to at least one of the embodiments of the present invention. In a case where a virtual space 70 defined by the program is represented by a hemispherical space as shown, the field of view of a player 80 wearing the display device 1 on the head corresponds to a visible region 81. That is, an image corresponding to the visible region 81 is displayed on the display screen 17 of the display device 1. For example, when the player 80 turns to the left, the visible region 81 moves to the left side according to the movement of the player 80. Similarly, in the vertical direction, for example, when the player 80 turns upward, the visible region 81 moves upward according to the movement of the player 80.

Figure 7:
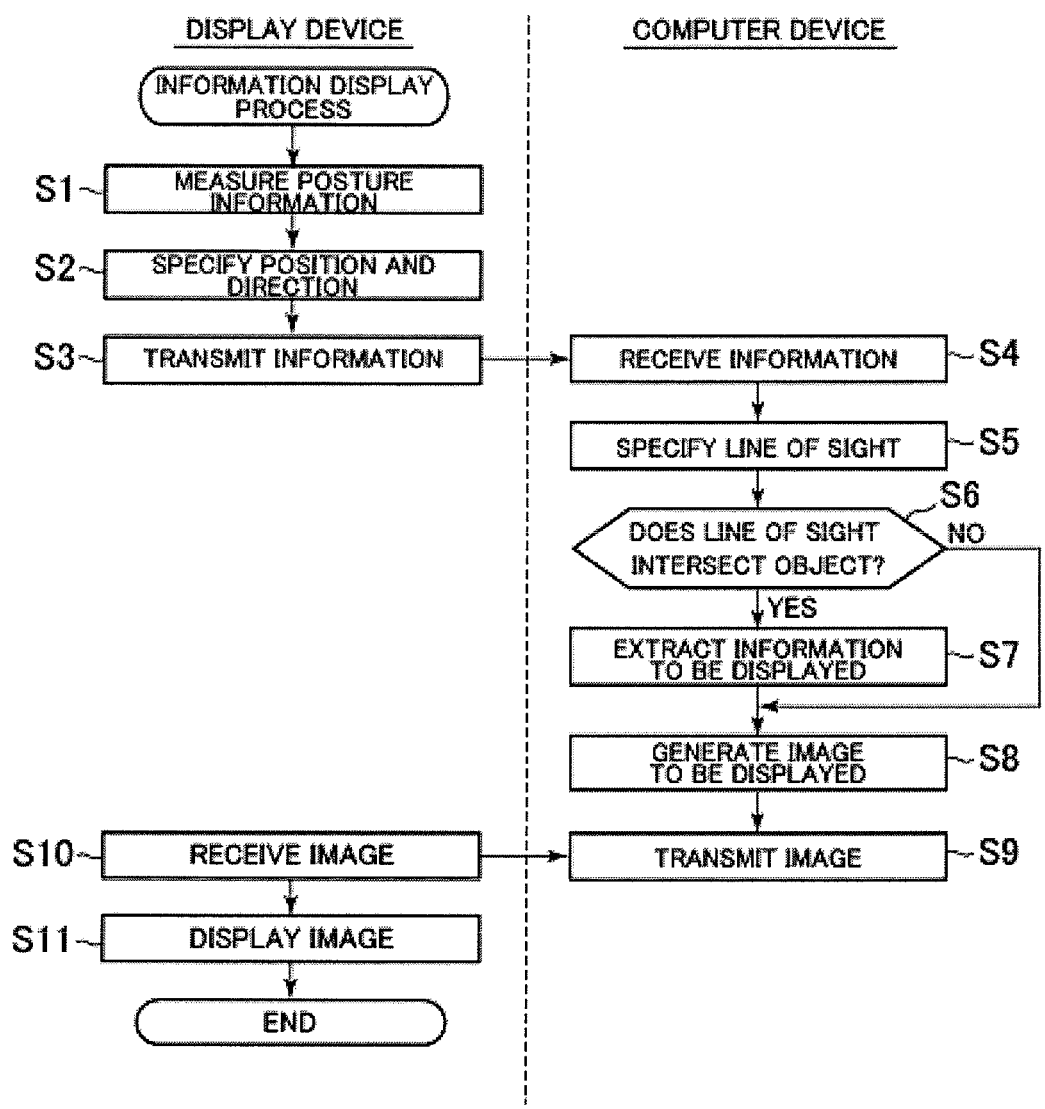
FIG. 7 is a flowchart of a program execution process, corresponding to at least one of the embodiments of the present invention.

Next, a process of displaying information will be described. FIG. 7 is a flowchart of a program execution process, corresponding to at least one of the embodiments of the present invention. First, posture information of the display device 1 is measured (step S1). The posture information is measured by various sensors included in the sensor unit 18 of the display device 1.

Next, the optical sensor mounted on the display device 1 senses the laser beam irradiated from the irradiation device 2, and specifies the position and direction of the display device 1 (step S2). The process of steps S1 and S2 may be performed at predetermined intervals and the results may be transmitted to the computer device 3 for every measurement or specification and a display image to be displayed on the display screen 17 of the display device 1 may be generated.

The posture information measured in step S1 and the information on the direction and position specified in step S2 are transmitted to the computer device 3 (step S3). The computer device 3 receives the information (step S4) and specifies the line of sight of the player in the virtual space, based on the posture information measured in step S1 and the position information specified in step S2 (step S5).

The line of sight of the player in the virtual space is a direction which is assumed to be viewed by the player in the virtual space, in the visible region 81, which is specified based on the posture information (information on the inclination with respect to the horizontal plane) of the display device 1, the information on the position, and the information on the direction (information on which direction on the plane parallel to the horizontal plane the line of sight is directed). For example, the viewpoint of the virtual camera is set at the position of the display device 1, and based on the direction of the display device 1, it is possible to specify which direction the line of sight is directed on a plane parallel to the horizontal plane in the virtual world, with the viewpoint as the start point, and the inclination of the line of sight with respect to the horizontal plane, based on the posture information of the display device 1. By doing as described above, it is possible to display an object present in a direction presumed to be viewed by the player in the virtual world on the display device 1, without making the player aware of it, thereby improving the convenience of the player, and the player can be more immersed in a virtual world.

Meanwhile, the display device 1 may have a function capable of tracking the line of sight of the user wearing the display device 1. In this case, the line of sight can be calculated from the motion of the eyeball.

Next, it is determined whether or not the line of sight of the player specified in step S5 intersects the object present in the virtual space (step S6). An object is a character, an enemy character, an item, an object displayed in a virtual space, or the like.

In a case where it is determined that the line of sight of the player intersects the object present in the virtual space (YES in step S6), the information set to be displayed is extracted from among the information related to the character (step S7), based on the information stored in the storage 33 of the computer device 3, the information read from the disc 41, the information read from the communication interface 37, or the information read from the interface unit 38, and an image to be displayed by including the extracted information is generated (step S8). In a case where it is determined that the line of sight of the player does not intersect the object present in the virtual space (NO in step S6), an image to be displayed is generated without extracting information (step S8).

Subsequently, the computer device 3 transmits the generated image to the display device 1 (step S9). The display device 1 receives the image (step S10), displays the received image on the display screen 17 (step S11), and ends the process.

After it is determined in step S6 that there is an intersection with the object, and the image including the added information is generated in step S8, in a case where it is determined in step S6 that the line of sight of the player does not intersect the object by the player changing the position and direction of the display device 1, the information added and displayed is deleted, and an image is generated in step S8. That is, if the player diverts the line of sight from the object, the information on the object is hidden.

Figure 8:
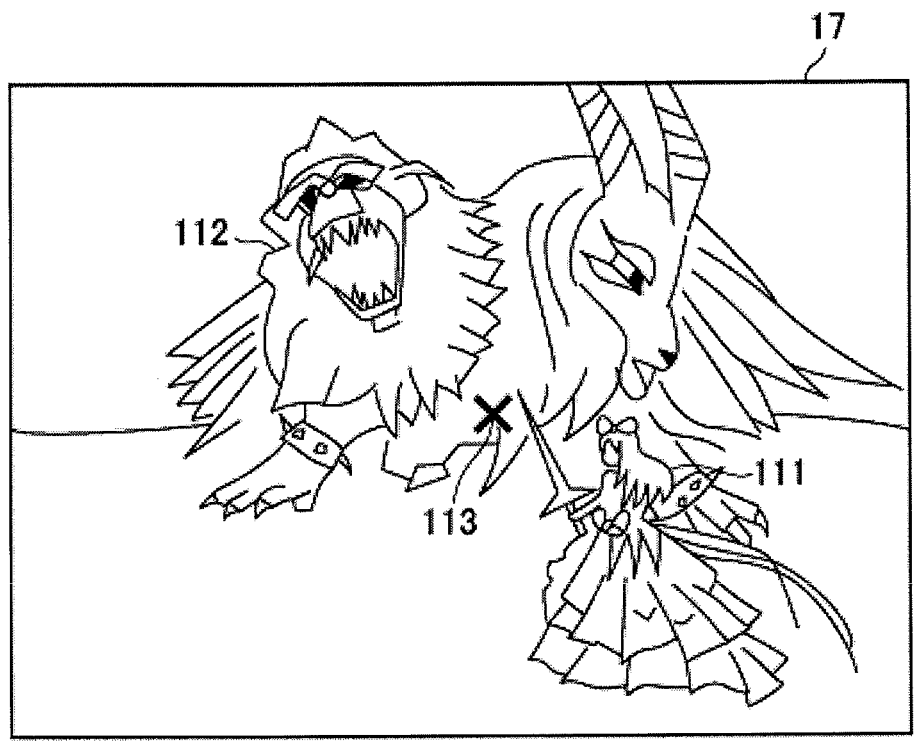
FIGS. 8A and 8B are diagrams for describing the concept of the line of sight of a player in a virtual space and an object, corresponding to at least one of the embodiments of the present invention.
Figure 8:
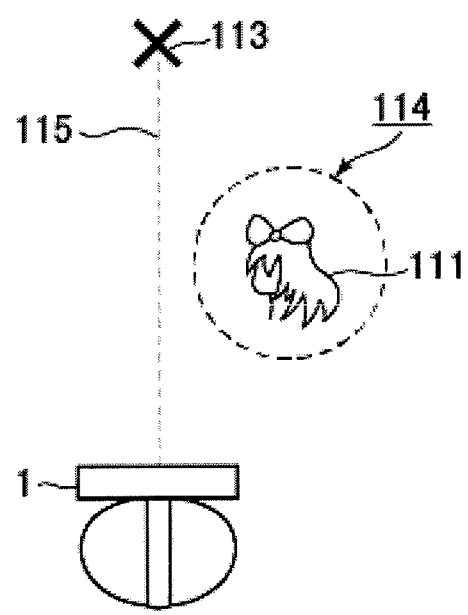

Here, the intersection between the line of sight of the player and the object will be described. FIGS. 8A and 8B are diagrams for describing the concept of the line of sight of a player in a virtual space and an object, corresponding to at least one of the embodiments of the present invention. Intersection means that the line of sight and the boundary surface forming an object intersect each other, and it is a concept including a contact between a line and a surface.

FIG. 8A is an example of a situation in which the line of sight of the player and the character do not intersect in the virtual battle. On the display screen 17, a character 111 other than the player character, an enemy character 112, and a point 113 showing the line-of-sight direction of the player are displayed. Since the displayed point 113 prevents immersion in the virtual world, the point 113 may be hidden on the display screen.

FIG. 8B is a bird's eye view showing a schematic positional relationship between the character 111 and the point 113 in the situation of FIG. 8A. The point 113 indicating the line-of-sight direction is displayed at a predetermined distance from the player in the front direction of the player wearing the display device 1. Further, a determination area 114 for performing intersection determination as to whether or not to display information in a case where the line of sight of the player intersects an object is set for the character 111 in advance. A line 115 connecting the display device 1 and the point 113 is a line indicating a direction assumed to be viewed by the player in the virtual space. The intersection determination in step S6 is performed, depending on whether or not the determination area 114 set in the character 111 and the line 115 intersect.

Figure 9:
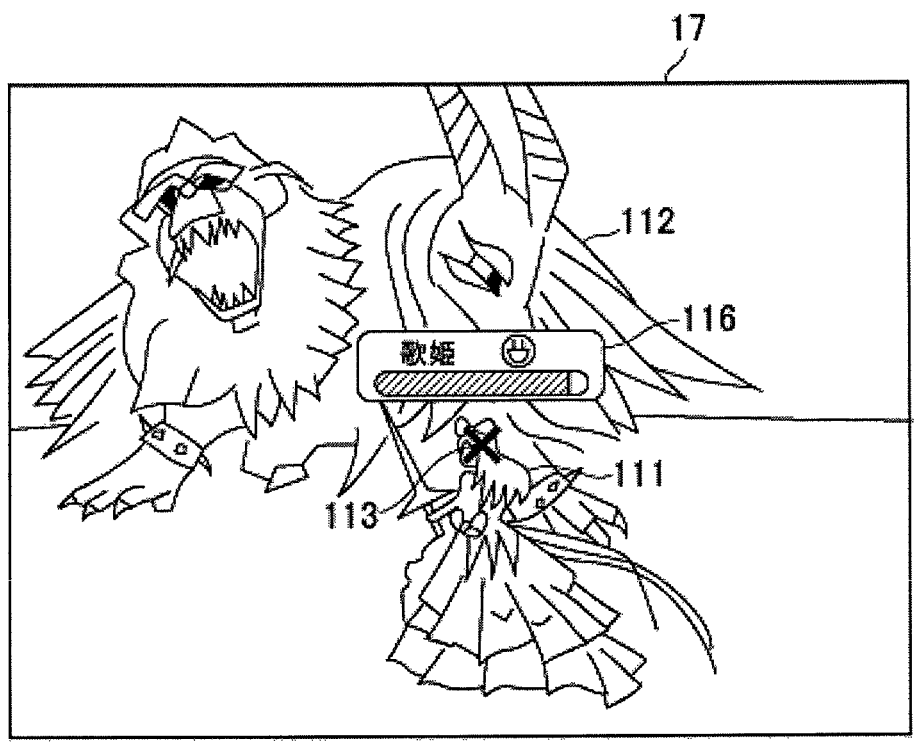
FIGS. 9A and 9B are diagrams for describing the concept of the intersection of the line of sight of the player and the object in the virtual space, corresponding to at least one of the embodiments of the present invention.
Figure 9:
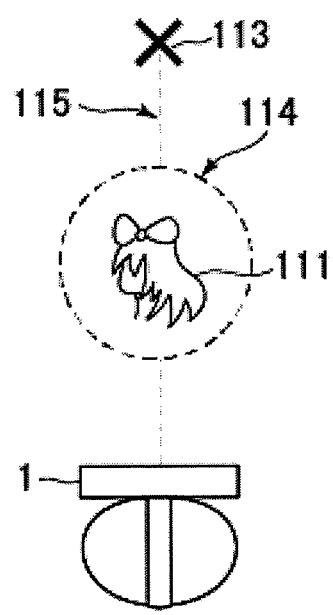

FIGS. 9A and 9B are diagrams for describing the concept of the intersection of the line of sight of the player and the object in the virtual space, corresponding to at least one of the embodiments of the present invention. FIG. 9A is an example of a situation where the line of sight of the player and the character intersect in a virtual battle. The character 111 other than the player character, the enemy character 112, the point 113 indicating the line-of-sight direction of the player, and information 116 on the character 111, which is displayed from the result of intersection between the line of sight and the character 111 are displayed on the display screen 17.

FIG. 9B is a bird's eye view showing a schematic positional relationship between the character 111 and the point 113 in the situation of FIG. 9A. The point 113 indicating the line-of-sight direction is displayed at a predetermined distance from the player in the front direction of the player wearing the display device 1. Furthermore, the determination area 114 is set for the character 111 in advance. The line 115 connecting the display device 1 and the point 113 is a line indicating a direction assumed to be viewed by the player in the virtual space.

The point 113 is illustrated at a position further than the distance from the player to the character 111 in FIG. 9B, but the point 113 is shown before the character 111 in FIG. 9A. When it is determined that the line of sight of the player intersects the character 111, the information 116 on the character 111 is displayed on the display screen 17. The information 116 includes, for example, a name and an attribute of the character, an icon representing the condition of the character, a physical fitness value representing the physical strength of the character, a psychological value indicating the energy of the character, or the like.

The information 116 is not visible in the real world, but is necessary information for causing the game to progress, it is preferable that the information 116 is displayed only in a case where the line of sight is directed toward the object. By doing as described above, it is possible to perform screen display control with higher preference without impairing the sense of immersion of the player.

Figure 10:
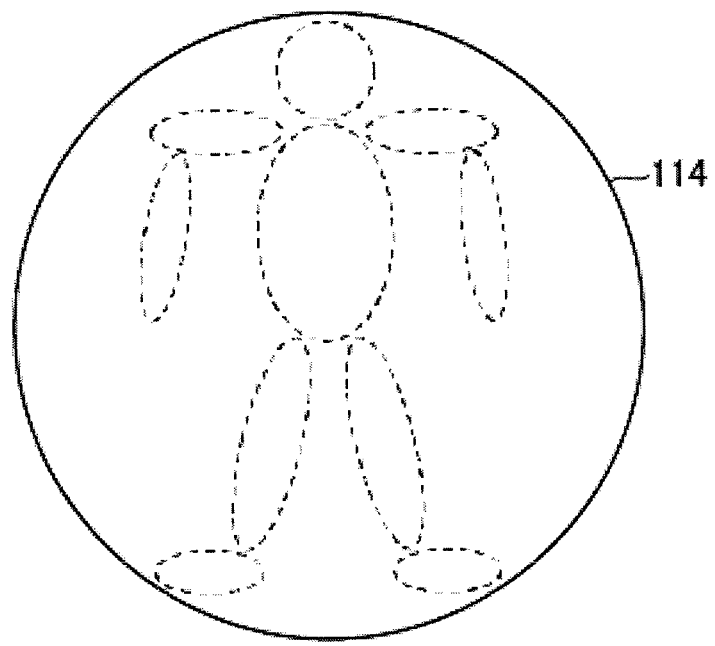
FIGS. 10A and 10B are diagrams for describing a method of setting an area for determining intersection with the line of sight of the player in the virtual world, corresponding to at least one of the embodiments of the present invention.
Figure 10:
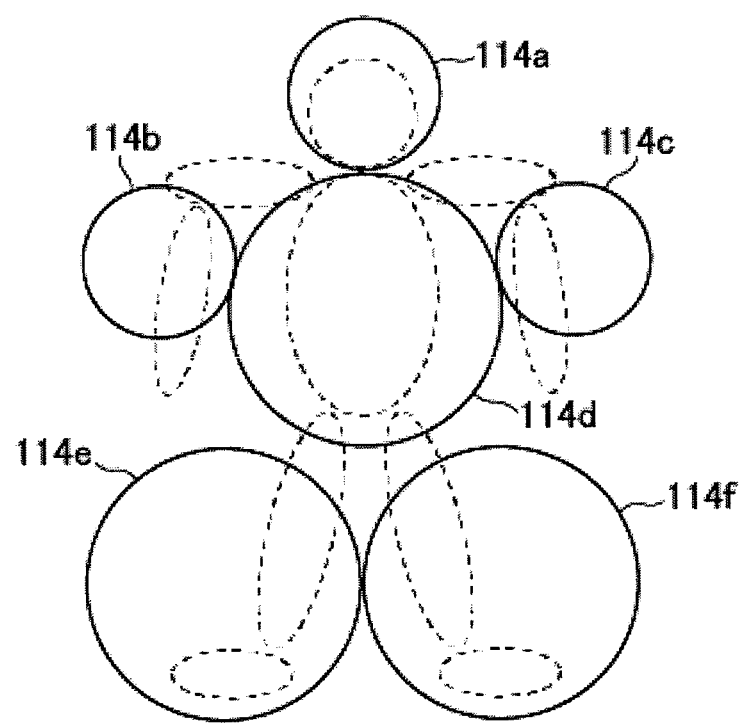

Further, the setting of the determination area 114 for determining the intersection for displaying the information in a case of intersection with the line of sight of the player will be described. FIGS. 10A and 10B are diagrams for describing a method of setting an area for determining intersection with the line of sight of the player in the virtual world, corresponding to at least one of the embodiments of the present invention.

FIG. 10A shows the determination area 114 set for a humanoid character. It is preferable to set the determination area 114 corresponding to the shape of the character. However, it has difficulties in terms of an increase of the load of the determination process due to the complicated shape, and the human cost of setting the determination area.

Therefore, as shown in FIG. 10A, a sphere including the humanoid character can be defined to be the determination area 114. The center point of the sphere may be calculated from the coordinate position indicating the size of the humanoid character, or in the case where the humanoid character is displayed by a polygon, the vertex of the specific bone may be the center point. By doing as described above, it is possible to determine the line of sight to the character, without causing the player to feel uncomfortable, and to reduce the load of the determination process.

On the other hand, if the determination area is set as a sphere in an extremely long character or the like in one direction, the determination area is expanded to a space far away from the character, and information related to the character is additionally displayed even in the space where the character clearly is not present, which can cause the player to feel uncomfortable. Therefore, as shown in FIG. 10B, a plurality of determination areas 114 can be set for each part of the body. More specifically, determination areas 114a to 114f are set in the head portion, the body portion, the left and right arm portions, and the left and right leg portions, respectively. By doing as described above, it is possible to set the determination area 114 while suppressing the load of the determination process and the development cost, and it is possible to display the information without causing the player to feel uncomfortable.

For determining the intersection of a line segment and an object in a three-dimensional space, for example, a method for obtaining an intersection point of an object and a ray (light ray) can be used in a ray tracing method. Other methods can be used, and the present invention is not limited by an intersection determination method.

As a game to which the embodiment of the present invention can be applied, for example, a role playing game (RPG) in which a plurality of characters appear, or a game that the player proceeds by knowing information on an object present in the virtual world like a treasure hunting is preferred, but it is not limited thereto. The present invention can be applied to massively multiplayer online (MMO) type games in which an unspecified number of players participate through the Internet.

In the embodiment of the present invention, the light beam for specifying the positions of the display device 1 and the controller 4 is a laser beam, for example, infrared ray, but the light beam is not limited to this, and the light beam may be visible light rays or invisible light rays.

In the embodiment of the present invention, an aspect is described in which an image is generated in a manner that can be viewed in a case where the line of sight intersects the object, but the present invention is not limited thereto. In other words, any aspect may be used as long as it can be recognized by human perception. For example, in a case where the line of sight intersects the object, sound may be generated in an aspect that can be recognizable by auditory sense.

As an aspect of the embodiment of the present invention, in a case where the line of sight of the player intersects the object, it is possible to suppress a decrease in the sense of immersion in the game of the player, by displaying information.

As an aspect of the embodiment of the present invention, by setting the intersection determination area as a sphere, the load of the determination process can be reduced, and the cost for setting the determination area can be reduced.

In the embodiment of the present invention, examples of the "display device" includes a device called a head mount display (HMD). "Being mounted on the head" refers to covering the head like a hat, attaching to the face like eyeglasses, or attaching to other parts of the head, and it is a concept including a case extending from a part of the body to cover the head as well. "Direction" is a concept including not only the direction and angle of an object, but also the direction relating to a change amount per unit time such as acceleration. "Virtual space" is, for example, a space defined by programs and data, and is a virtual space generated by a computer.

In the embodiment of the present invention, "irradiation device" is, for example, a device that irradiates light within a predetermined range, and it does not matter whether the range is narrow or wide. "Virtual camera" refers to, for example, a viewpoint or an angle of view when drawing computer graphics which are analogous to a camera. "Visual axis" refers to, for example, the axis of the line of sight of the virtual camera. "Object" refers to, for example, a tangible object present in the virtual space.

"Information associated with an object" refers to, for example, information on physical strength, state, attribute, and the like of another character, information on an item, and other types of information related to object data. "Adding information associated with an object" refers to, for example, adding added information in an aspect that can be recognized by human perception. "Reference point" refers to, for example, the center point of a sphere including an object.

APPENDIX

The above embodiments have been described such that the following invention can be carried out by those having ordinary knowledge in the field to which the present invention belongs.

(1) A display system including a display device which is used by being mounted on the head of a player, comprising: a virtual camera specifier that specifies a visual axis and/or a position of a virtual camera in a virtual space, according to a direction and/or a position of the display device; and a displayer that displays an object present in the virtual space, on the display device, according to the visual axis and/or the position of the virtual camera, wherein in a case where there is an object on the visual axis specified by the virtual camera specifier, the displayer additionally displays information associated with the object.

(2) The display system according to (1), wherein a predetermined area is set for the object, wherein the system further includes a game determiner that determines whether or not the predetermined area which is set for the object and the visual axis of the virtual camera intersect each other, and wherein in a case where the game determiner determines that the predetermined area and the visual axis intersect each other, it is determined that there is an object on the visual axis, and the displayer additionally displays information associated with the object.

(3) The display system according to (1) or (2), wherein in a case where the game determiner determines that the predetermined area and the visual axis do not intersect each other, because the visual axis and/or the position of the virtual camera change after the game determiner determines that the predetermined area and the visual axis intersect each other, the displayer hides the information associated with the displayed object.

(4) The display system according to any one of (1) to (3), wherein the predetermined area which is set for the object is a sphere centered on a reference point set in the object.

(5) A display method executed in a display system comprising a display device which is used by being mounted on the head of a player, and a computer device, comprising: a virtual camera specifying step of specifying a visual axis and/or a position of a virtual camera in a virtual space, according to a direction and/or a position of the display device; and a display step of displaying an object present in the virtual space, on the display device, according to the visual axis and/or the position of the virtual camera, wherein in the display step, in a case where there is an object on the visual axis specified in the virtual camera specifying step, information associated with the object is additionally displayed.

(6) A computer device capable of being connected to a display device which is used by being mounted on the head of a player, by communication, comprising: a virtual camera specifier that specifies a visual axis and/or a position of a virtual camera in a virtual space, according to a direction and/or a position of the display device; and a displayer that displays an object present in the virtual space, on the display device, according to the visual axis and/or the position of the virtual camera, wherein in a case where there is an object on the visual axis specified by the virtual camera specifier, the displayer additionally displays information associated with the object.

REFERENCE SIGNS LIST

1 DISPLAY DEVICE
11 CONTROL UNIT
12 RAM
13 STORAGE
14 IMAGING UNIT
15 GRAPHICS PROCESSOR
16 DISPLAY UNIT
17 DISPLAY SCREEN
18 SENSOR UNIT
18a PROXIMITY SENSOR
18b INFRARED SENSOR
18c GYROSENSOR
18d ACCELERATION SENSOR
19 COMMUNICATION INTERFACE
2 IRRADIATION DEVICE
20 INTERFACE UNIT
21 LENS
3 COMPUTER DEVICE
4 CONTROLLER
5 COMMUNICATION NETWORK
31 CONTROL UNIT
32 RAM
33 STORAGE
34 SOUND PROCESSOR
35 GRAPHICS PROCESSOR
36 DVD/CD-ROM
37 COMMUNICATION INTERFACE
38 INTERFACE UNIT
39 FRAME MEMORY
40 SOUND OUTPUT DEVICE

41 DISC
51 DISPLAY DEVICE
52 IMAGING DEVICE
53 COMPUTER DEVICE
54 CONTROLLER

The invention claimed is:

1. A display system including a display device configured to be mounted on a head of a player, the display system comprising:
   a virtual camera processor that specifies a visual axis of a virtual camera in a virtual space according to a direction of the display device, and that determines a line of sight of the player based on posture information of the display device;
   a game processor; and
   the display device, when a virtual game character is determined to intersect with the line of sight of the player, extracts game character status information of the virtual game character and displays the extracted game character status information of the virtual game character, the virtual game character being present in the virtual space according to the visual axis of the virtual camera,
   wherein the game character status information associated with the virtual game character includes information on a state or attribute of the player's virtual game character,
   wherein the game character status information is displayed near the virtual game character,
   wherein an image is generated for display on the display device based on an input received on a controller device, the controller device being separate from the display device,
   wherein a plurality of predetermined areas is set for the virtual game character,
   wherein the game processor determines that the virtual game character intersects with the line of sight of the player when at least one of the plurality of predetermined areas set for the virtual game character intersects with the line of sight of the player,
   wherein each of the predetermined areas set for the virtual game character is a sphere, and
   wherein a plurality of spheres representing the plurality of the predetermined areas is set for a plurality of body parts of the virtual game character.

2. The display system according to claim 1,
   wherein, in a case where the game processor determines that the at least one of the plurality of predetermined areas set for the virtual game character and the line of sight of the player do not intersect each other, the display device hides from display the game character status information associated with the displayed virtual game character.

3. The display system according to claim 1,
   wherein each of the plurality of spheres is centered on a reference point set in the virtual game character.

4. The display system according to claim 1,
   wherein the game character status information and the virtual game character are separated such that they do not overlap one another.

5. The display system according to claim 1,
   wherein the game character status information is displayed to the player having mounted the display device on the player's head.

6. The display system according to claim 1,
   wherein the display device displays the game character status information only when the at least one of the plurality of predetermined areas set for the virtual game character intersects with the line of sight of the player, such that the game character status information is not displayed when the at least one of the plurality of predetermined areas set for the virtual game character does not intersect with the line of sight of the player.

7. The display system according to claim 1,
   wherein the display device displays the game character status information only during a time when the at least one of the plurality of predetermined areas set for the virtual game character intersects with the line of sight of the player, such that the game character status information is removed from display when the at least one of the plurality of predetermined areas set for the virtual game character no longer intersects with the line of sight of the player.

8. The display system according to claim 1,
   wherein an action performed by the virtual game character is controlled by the controller device, while the game character status information is extracted by the display device.

9. The display system according to claim 1,
   wherein the game character status information is displayed adjacent to the virtual game character when the at least one of the plurality of predetermined areas set for the virtual game character intersects with the line of sight of the player, and the game character status information is hidden from display when the at least one of the plurality of predetermined areas set for the virtual game character does not intersect with the line of sight of the player.

10. The display system according to claim 1,
    wherein the plurality of the spheres is set for the virtual game character not to overlap each other.

11. The display system according to claim 1,
    wherein the plurality of the spheres includes spheres of different sizes.

12. The display system according to claim 1,
    wherein at least one of the plurality of the spheres is larger than a corresponding body part of the virtual game character to include entirety of the corresponding body part.

13. The display system according to claim 1,
    wherein at least one of the plurality of spheres includes a portion of the body part but not an entirety of the corresponding body part.

14. A display method executed in a display system including a display device configured to be mounted on a head of a player, and a computer device, the method comprising:
    specifying, by a virtual camera processor, a visual axis of a virtual camera in a virtual space according to a direction of the display device;
    determining, by the virtual camera processor, a line of sight of the player based on posture information of the display device;
    when a virtual game character is determined to intersect with the line of sight of the player, extracting, by the display device, game character status information of the virtual game character, the virtual game character being present in the virtual space according to the visual axis of the virtual camera; and
    displaying, on the display device, the extracted game character status information of the virtual game character, wherein the game character status information associated with the virtual game character includes information on a state or attribute of the player's virtual game character, wherein the game character status information is displayed near the virtual game character, wherein an image is generated for display on the display device based on an input received on a controller device, the controller device being separate from the display device, wherein a plurality of predetermined areas is set for the virtual game character, wherein the virtual game character is determined to intersect with the line of sight of the player when at least one of the plurality of predetermined areas set for the virtual game character intersects with the line of sight of the player, wherein each of the predetermined areas set for the virtual game character is a sphere, and wherein a plurality of spheres representing the plurality of the predetermined areas is set for a plurality of body parts of the virtual game character.

15. A computer device configured to connect, by communication, to a display device configured to be mounted on a head of a player, the computer device comprising:

a virtual camera processor that specifies a visual axis of a virtual camera in a virtual space according to a direction of the display device, and that determines a line of sight of the player based on posture information of the display device;

a game processor; and the display device, when a virtual game character is determined to intersect with the line of sight of the player, extracts game character status information of the virtual game character and displays the extracted game character status information of the virtual game character, the virtual game character being present in the virtual space according to the visual axis of the virtual camera, wherein the game character status information associated with the virtual game character includes information on a state or attribute of the player's virtual game character, wherein the game character status information is displayed near the virtual game character, wherein an image is generated for display on the display device based on an input received on a controller device, the controller device being separate from the display device, wherein a plurality of predetermined areas is set for the virtual game character, wherein the game processor determines that the virtual game character intersects with the line of sight of the player when at least one of the plurality of predetermined areas set for the virtual game character intersects with the line of sight of the player, wherein each of the predetermined areas set for the virtual game character is a sphere, and wherein a plurality of spheres representing the plurality of the predetermined areas is set for a plurality of body parts of the virtual game character.

\* \* \* \* \*